United States Patent
Hsu et al.

(10) Patent No.: US 8,254,276 B2
(45) Date of Patent: Aug. 28, 2012

(54) PACKET DATA SERVICES USING VERSION AND CAPABILITY INFORMATION

(75) Inventors: Raymond Tah-Sheng Hsu, San Diego, CA (US); Ragulan Sinnarajah, Marham (CA)

(73) Assignee: QUALCOMM Incorporated, San Diego, CA (US)

( * ) Notice: Subject to any disclaimer, the term of this patent is extended or adjusted under 35 U.S.C. 154(b) by 1039 days.

(21) Appl. No.: 10/911,823

(22) Filed: Aug. 4, 2004

(65) Prior Publication Data
US 2005/0128956 A1 Jun. 16, 2005

Related U.S. Application Data

(60) Provisional application No. 60/493,069, filed on Aug. 5, 2003.

(51) Int. Cl.
*G01R 31/08* (2006.01)
(52) U.S. Cl. .............. 370/252; 370/278; 455/154.1
(58) Field of Classification Search .......... 370/324, 370/350, 503, 507, 509, 278, 252, 328; 455/154.1
See application file for complete search history.

(56) References Cited

U.S. PATENT DOCUMENTS

| | | | |
|---|---|---|---|
| 5,805,301 A | 9/1998 | Rasanen | |
| 6,353,620 B1 * | 3/2002 | Sallberg et al. | 370/465 |
| 6,567,473 B1 | 5/2003 | Tzannes | |
| 6,603,756 B1 | 8/2003 | Tappan | |
| 6,795,704 B1 * | 9/2004 | Hardin | 455/432.3 |
| 7,035,635 B2 * | 4/2006 | Papoutsis et al. | 455/432.2 |
| 7,089,008 B1 * | 8/2006 | Back et al. | 455/437 |
| 7,171,195 B2 * | 1/2007 | Paivike et al. | 455/419 |
| 7,277,416 B1 * | 10/2007 | Chang et al. | 455/419 |
| 2001/0052012 A1 * | 12/2001 | Rinne et al. | 709/224 |
| 2002/0003804 A1 | 1/2002 | Hjalmtysson et al. | |
| 2002/0023162 A1 | 2/2002 | Ahn et al. | |
| 2002/0028673 A1 * | 3/2002 | Chang et al. | 455/419 |
| 2002/0054578 A1 * | 5/2002 | Zhang et al. | 370/328 |
| 2002/0068570 A1 | 6/2002 | Abrol et al. | |
| 2002/0176442 A1 * | 11/2002 | Favichia et al. | 370/465 |
| 2002/0193110 A1 * | 12/2002 | Julka et al. | 455/432 |
| 2003/0090998 A1 | 5/2003 | Lee et al. | |
| 2003/0101206 A1 | 5/2003 | Graziano et al. | |

(Continued)

FOREIGN PATENT DOCUMENTS

CA 2303467 A1 10/2000
(Continued)

OTHER PUBLICATIONS

3GPP, "Mobile radio interface layer 3 specification; Core network protocols; Stage 3 (Release 6)", 3GPP TS 24. 008 v6.0.0, Mar. 2003 Tables 9.5.1 and 10.5.154; paragraph 10.5.6.3.

(Continued)

*Primary Examiner* — Sai-Ming Chan
(74) *Attorney, Agent, or Firm* — Kristine U. Ekwueme

(57) ABSTRACT

A method and apparatus of providing packet data services that includes establishing an over-the-air communication connection between a mobile station and a wireless network infrastructure. The mobile station communicates a version and capability indication of a wireless packet data standard supported in the mobile station to the wireless network infrastructure. The wireless network infrastructure communicates a version and capability indication of the wireless packet data standard supported in the network infrastructure to the mobile station. Operation of the mobile station and wireless network infrastructure are adjusted in accordance with the indicated versions and capabilities.

27 Claims, 7 Drawing Sheets

U.S. PATENT DOCUMENTS

| | | | |
|---|---|---|---|
| 2003/0103484 A1* | 6/2003 | Oommen et al. | 370/338 |
| 2006/0128380 A1* | 6/2006 | Uchida | 455/432.1 |
| 2006/0246902 A1* | 11/2006 | Back et al. | 455/436 |

FOREIGN PATENT DOCUMENTS

| | | | |
|---|---|---|---|
| EP | 1248431 A | 10/2002 | |
| EP | 1440405 A1 | 7/2004 | |
| WO | 0105109 A | 1/2001 | |
| WO | WO0122764 | 3/2001 | |

OTHER PUBLICATIONS

Taiwanese Search report—093123534—TIPO—Dec. 2, 2010.

* cited by examiner

PACKET DATA SERVICES USING VERSION AND CAPABILITY INFORMATION

The present Application for Patent claims priority to Provisional Application No. 60/493,069 entitled "MS-PDSN Version/Features Indication" filed Aug. 5, 2003, and assigned to the assignee hereof and hereby expressly incorporated by reference herein.

BACKGROUND

1. Field

The invention relates generally to wireless communication, and more specifically to packet data services in a wireless communication system.

2. Background

Wireless communication systems are used in many applications including, for example, paging, wireless local loops (WLL), network access, Internet telephony, wireless telephone and satellite communication systems. An exemplary application of network access is accessing a packet data network such as the Internet using a wireless communication device (WCD) such as a cellular telephone.

Standards have been developed to define requirements for wireless packet data network accessing. One such standard is the Interim Standard published by the Telecommunications Industry Association, TIA/IS-835, entitled "cdma2000 Wireless IP Network Standard" herein incorporated in its entirety. Beginning in 2000, different releases of IS-835 have been published, i.e., IS-835, IS-835-A, IS-835-B, and IS-835-C. Currently, the development of IS-835-D is underway. Each release is backward compatible with earlier releases and adds new features. Thus, in a deployed network it is possible that devices with different versions of the standard, and correspondingly different features, may be communicating with each other.

As indicated in the title, the series of IS-835 standards specify the support of packet data services in cdma2000 systems. Specifically, the IS-835 series specify the requirements and optional features for a Mobile Station (MS) to establish Internet Protocol (IP) connectivity with a Packet Data Serving Node (PDSN) allowing the MS access to packet data services, such as Internet access. As noted, devices with different versions of the IS-835 standard are currently deployed and therefore it is possible that a PDSN and the MSs it serves may be operating with different versions of the standard. In addition, a MS may change from one PDSN to another PDSN that is operating with a different version of the standard than the original PDSN.

Because different features and capabilities may be available to the MSs and the PDSN's that they are communicating with, there may be inefficiency introduced into the communication between the various devices. For example, if a PDSN supports a particular feature that is not available to an MS that it is in communication with, there could be unnecessary signal messages exchanged between the PDSN and the MS if one device attempts to perform an operation that requires a particular feature to be supported by the other device. Thus, system efficiency could be improved with more effective communication of device capability.

There is therefore a need in the art for improving access to a packet data network by devices that support different features and capabilities.

SUMMARY

Embodiments disclosed herein address the above stated needs for improving access to a packet data network by devices that support different features and capabilities. A first aspect includes establishing an over-the-air physical layer connection that establishes communication between a mobile station and a wireless network infrastructure. The mobile station communicates a version and capability indication of a network layer wireless packet data standard supported in the mobile station to the wireless network infrastructure. The wireless network infrastructure communicates a version and capability indication of a network layer wireless packet data standard supported in the network infrastructure to the mobile station. Packet data is then communicated between the mobile station and wireless network infrastructure in accordance with the respective version and capability indications. Communications between the two can thereafter better exploit the respective capabilities.

The wireless packet data standard in the mobile station and the wireless network infrastructure can be versions of IS-835. Also, the over-the-air communication connection can be a radio channel, such as a CDMA channel. Communicating the version and optional feature capability indications of the mobile station and infrastructure may be performed during an origination process of a data session between the mobile station and the infrastructure, or after origination of the data session has been completed.

A mobile station may include a transmitter configured to communicate, over a physical layer, a version and capability indication of a network layer wireless packet data standard supported in the mobile station to a wireless network infrastructure. The mobile station may also include a receiver configured to receive, over a physical layer, a version and capability indication of a network layer wireless packet data standard supported in the wireless network infrastructure. A processor within the mobile station may adjust the mobile station operation in accordance with the version and capability of the mobile station and the wireless network infrastructure.

A wireless network infrastructure may include a receiver configured to receive, over a physical layer, a version and capability indication of a network layer wireless packet data standard supported in a mobile station. The wireless network infrastructure may also include a transmitter configured to communicate, over a physical layer, a version and capability indication of a network layer wireless packet data standard supported in the wireless network infrastructure to a mobile station. A processor within the wireless infrastructure may adjust the wireless network infrastructure operation in accordance with the version and capability of the mobile station and the wireless network infrastructure.

Other features and advantages of the present invention should be apparent from the following description of exemplary embodiments, which illustrate, by way of example, aspects of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
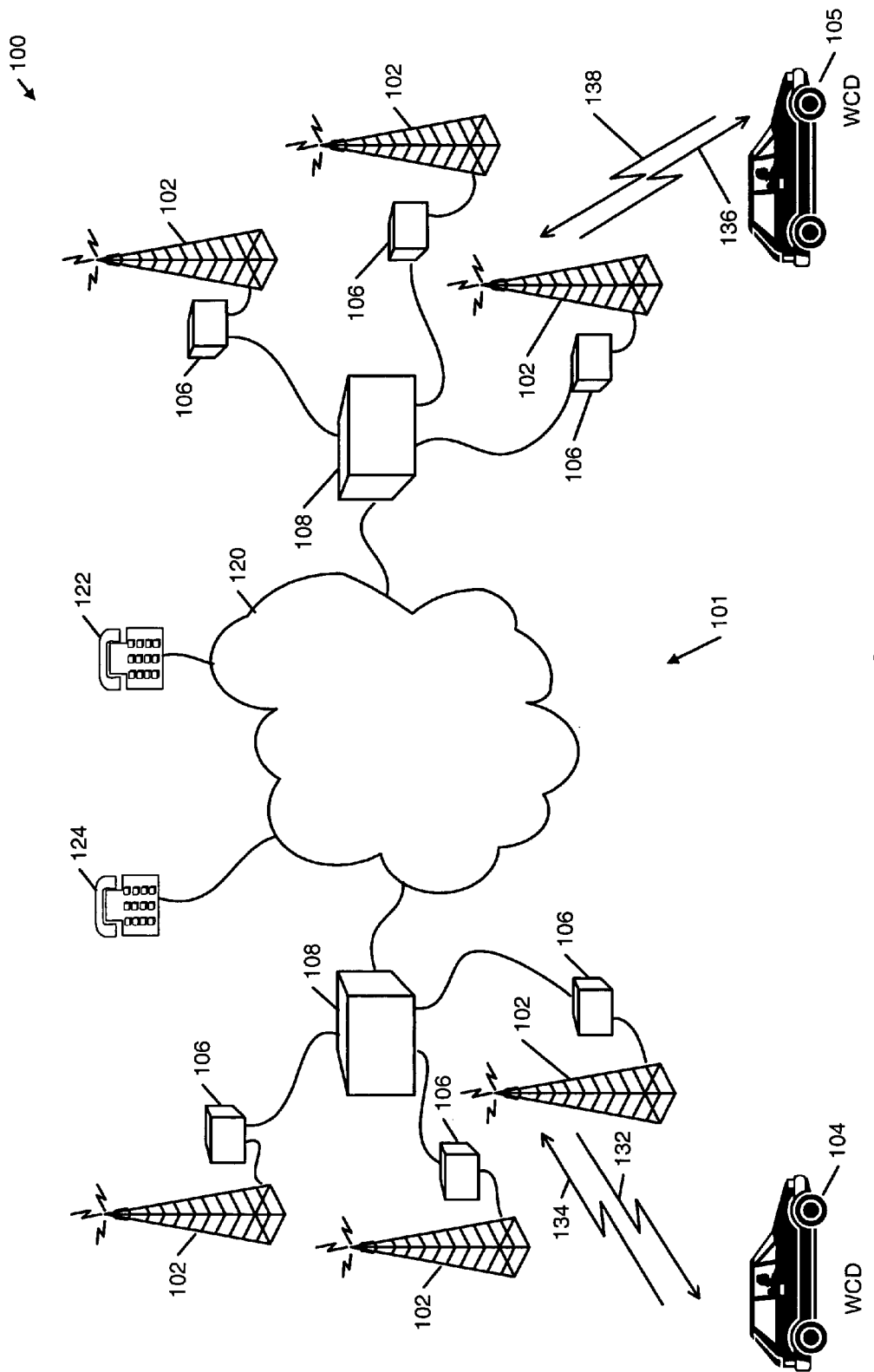
FIG. 1 shows a communication system constructed in accordance with the present invention.

FIG. 1 shows a communication system 100 constructed in accordance with the present invention. The communication system 100 includes infrastructure 101, multiple wireless communication devices (WCD) 104 and 105, and landline communication devices 122 and 124. The WCDs will also be referred to as mobile stations or mobiles. In general, WCDs may be either mobile or fixed.

The infrastructure 101 also includes other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, the switching network 120 may be the public switched telephone network (PSTN).

The term "forward link" refers to the signal path from the infrastructure 101 to a WCD, and the term "reverse link" refers to the signal path from a WCD to the infrastructure. As shown in FIG. 1, WCDs 104 and 105 receive signals 132 and 136 on the forward link and transmit signals 134 and 138 on the reverse link. In general, signals transmitted from a WCD 104 and 105 are intended for reception at another communication device, such as another remote unit, or a landline communication device 122 and 124, and are routed through the switching network 120. For example, if the signal 134 transmitted from an initiating WCD 104 is intended to be received by a destination WCD 105, the signal is routed through the infrastructure 101 and a signal 136 is transmitted on the forward link to the destination WCD 105. Typically, a communication device, such as a WCD or a landline communication device, may be both an initiator of and a destination for the signals.

Examples of WCDs 104 include cellular telephones, wireless communication enabled personal computers, and personal digital assistants (PDA), and other wireless devices. The communication system 100 may be designed to support one or more wireless standards. For example, the standards may include standards referred to as TIA/EIA-95-B (IS-95), TIA/EIA-98-C (IS-98), cdma2000, Wideband CDMA (WCDMA), and others.

Figure 2:
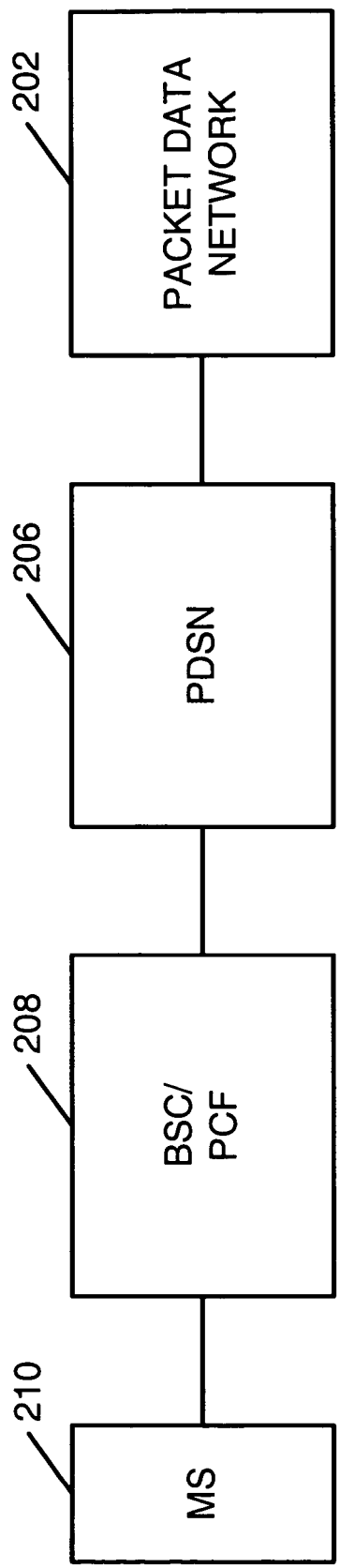
FIG. 2 illustrates components of an exemplary wireless network that can deliver access to a packet data network through a system such as illustrated in FIG. 1.

FIG. 2 illustrates components of an exemplary wireless network that can deliver access to a packet data network layer through a system such as illustrated in FIG. 1. As shown in FIG. 2, the wireless network infrastructure can include a packet data network 202, a Packet Data Service Node (PDSN) 206, a Base Station Controller/Packet Control Function (BSC/PCF) 208 and subscribing WCDs, such as mobile stations (MS) 210. The packet data network 202 typically communicates to the PDSN 206 and the PDSN 206 sends packet data to the BSC/PCF 208, which chooses physical layer connection that establishes communication to MS, such as a type of radio channel (usually shared radio channel) and transmits the packet data over the selected radio channel. The MS 210 receives the desired packet data carried over the radio channel. Likewise, the MS 210 can send packet data over the radio channel to the BSC/PCF 208 that sends the packet data to the PDSN 206 that communicates the packet data to the packet data network.

It's desirable for the MS and PDSN to indicate to each other their respective version and capability of the network layer wireless packet data standard supported, for example, to avoid unnecessary signaling exchange between the MS and PDSN during IP connectivity establishment. For example:

If the MS doesn't support Simple IPv4 and Mobile IPv4, the PDSN can avoid initiating the IP Control Protocol (IPCP) negotiation with the MS.

If the MS doesn't support Simple IPv6, the PDSN can avoid initiating the IPv6 Control Protocol (IPv6CP) negotiation with the MS.

If the MS only uses Mobile IPv4, the PDSN can avoid proposing the Challenge Handshake Authentication Protocol (CHAP) during the Link Control Protocol (LCP) negotiation, which may save a round of LCP message exchange.

If the MS is always-on but does not support the 3GPP2 vendor specific Max PPP Inactivity Timer value packet, the PDSN can avoid sending unnecessary vendor-specific packets to the MS.

If PDSN doesn't support multiple service instances, the MS can avoid sending unnecessary signaling for flow mapping/treatment and OTA signaling for originating auxiliary service instances.

If HA resource management is supported via Mobile IP revocation or Dynamic Authorization Extension (DAE), then the MS can avoid sending Mobile IP Registration Request with lifetime zero to de-register during power-down.

If the PDSN is an earlier version (i.e., Version C or earlier), then the MS can avoid sending signaling per Version D features (e.g., DHCP).

A proposal by Nortel Networks Corporation to the 3rd Generation Partnership Project 2 (3GPP2) entitled "Support for Capability Indication", incorporated in its entirety herein, proposes that the MS and PDSN indicate to each other the list of features supported by each of them via a Point-to-Point Protocol (PPP) vendor-specific packet. The list of supported features could be long, taking up bandwidth and making this technique undesirable for wireless transport.

A proposal to the 3GPP2 by Research In Motion entitled "Support for PDSN Protocol revision", incorporated in its entirety herein, proposes that the PDSN indicates its protocol revision number to the MS via a PPP vendor-specific packet. The protocol revision number doesn't convey information on whether or not the PDSN supports certain optional features. For example, the support of the Robust Header Compression (ROHC) technique developed by the ROHC Working Group of the Internet Engineering Task Force, incorporated in its entirety herein, is optional in IS-835-B. Revision number alone will not indicate whether the ROHC feature is supported.

A limitation common to both of these proposals is that MSs and PDSNs operating with earlier versions of IS-835, that is IS-835-C and earlier, do not support using a PPP vendor-specific packet for Version/Capability indication. Thus, MSs and PDSNs that operate using these earlier versions of the standard are not supported by these proposals. For example, under these proposals if the serving PDSN is operating an earlier version of the IS-835 standard, an IS-835-D compliant MS would not know which version the serving PDSN is operating. As a result, wasteful signaling exchange can occur if the MS and PDSN have different Version/Capabilities.

The following discussion describes techniques for a MS and a PDSN to exchange capability indication information for protocol version, plus a list of supported optional features. An aspect of these techniques is that the capability indication can be conveyed by an Over-the-Air (OTA) physical layer connection signaling mechanism in addition to PPP.

Version/Capability Indication

Figure 3:
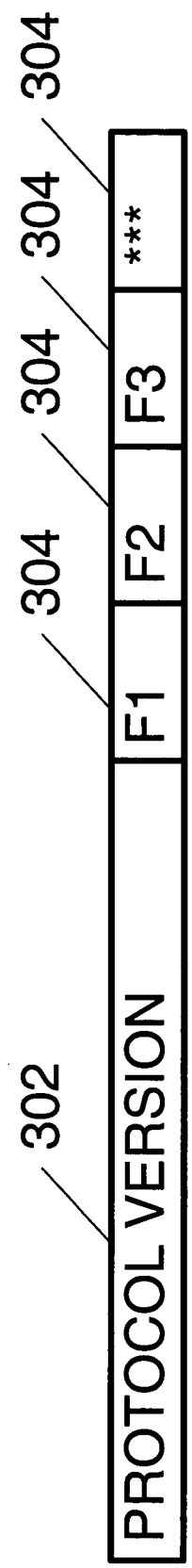
FIG. 3 is a block diagram illustrating a exemplary format for coding a capability indication message.

In one embodiment, a PDSN, or MS, indicates its protocol version plus a list of any supported optional features. FIG. 3 is a block diagram illustrating an exemplary format for coding a capability indication message. As shown in FIG. 3, the IS-835 protocol version 302 is indicated in one portion of the message. For example the version can be represented using one byte to represent the version of the IS-835 standard to which the MS or PDSN is compliant. In one embodiment, the value can be either 0, 1, 2, 3, or 4 corresponding to IS-835, IS-835-A, IS-835-B, IS-835-C, and IS-835-D, respectively. For example, if the PDSN indicates 2 as the protocol version number, the PDSN supports all the mandatory PDSN requirements specified in IS-835-B.

Additional optional features which the sender supports can be represented in other portions of the message 304. For example, a list of code points can be defined for the optional features allowed in each IS-835 standard. These optional features can be represented, for example, using one bit, one byte, or other combination for each optional feature. In addition, if particular features are supported as a group, for example if one feature is supported the other features of the group must also be supported, then the group can be represented as a single feature instead of identifying each feature individually.

An advantage of this technique is that it avoids the PDSN or MS having to send a long list of capability indication data over the air. In addition, the technique has flexibility allowing it to convey optional features supported. This technique is also independent of the transport mechanism. Thus, the technique can be used via the PPP vendor-specific packet as described above, or via the OTA signaling as described below.

OTA Signaling Mechanism

Figure 4:
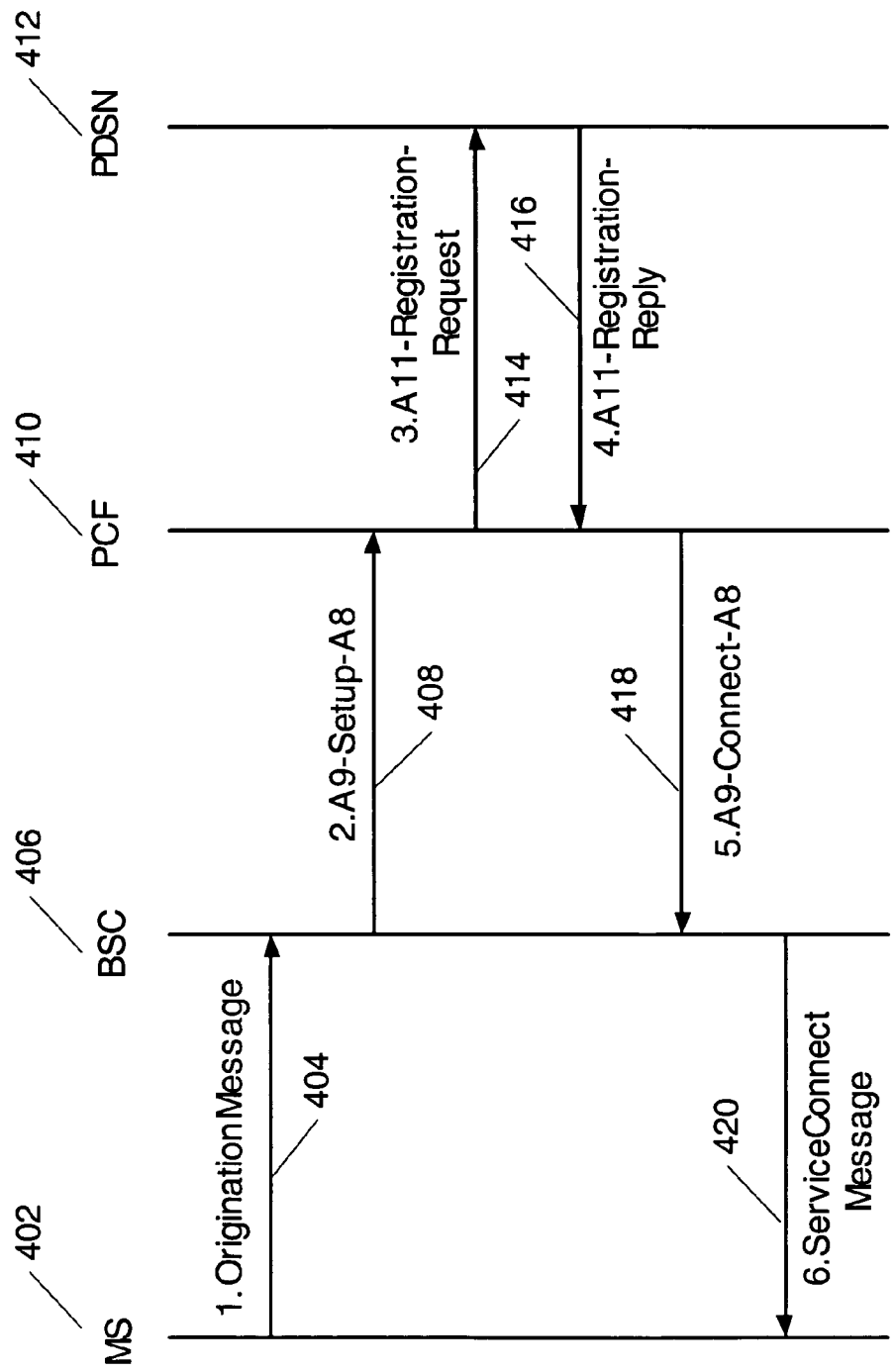
FIG. 4 is a call flow diagram illustrating an example of a MS and network using OTA signaling to convey the Version/Capability indication.

FIG. 4 is a call flow diagram illustrating an example of a MS and network using OTA signaling to convey the Version/Capability indication. As shown in FIG. 4, a MS 402 sends an Origination Message 404 to a base station controller (BSC) 406 to begin a data session. The Origination Message 404 establishes an over-the-air connection to support communication between the MS 402 and the BSC 406, for example, to transport data traffic between the MS and BSC. Included within the Origination Message 404 is a Version/Capability indication of the MS 402. The indication includes data that specifies the version of the IS-835 standard and any optional features that are supported. After the origination message, the BSC 406 sends an A9-Setup-A8 message 408 message to a Packet Control Function (PCF) 410. Included within the A9-Setup-A8 message is the capability indication of the MS 402. The PCF 410 selects a PDSN 412 for the MS 402. It is noted that the MS's 402 Version/Capability may be a criterion in selecting a PDSN 412 for the MS 402. After the PCF 410 selects a PDSN 412, the PCF 410 sends a A11-Registration-Request message 414 for establishing an A10 connection to transport data traffic for the MS 402 between the PCF 410 and PDSN 412. Included within the A11-Registration-Request message 414 is the MS's 402 Version/Capability indication. Additional details about conventional A10 and A11 interfaces can be found in document 3GPP2 A.S0017-0 Version 2.0 entitled "Interoperability Specification (IOS) for cdma2000 Access Network Interface—PArt 7 (A10 and A11 Interfaces (3G-IOSv4.2)" dated May 2002, incorporated herein in its entirety.

Upon successful establishment of the A10 connection, the PDSN 412 responds to the PCF 410 with an A11-Registration-Reply message 416. The PDSN 412 may include its Version/Capability indication in the A11-Registration-Reply message 416. This may be possible for newer versions of PDSNs 412, for example, PDSNs 412 that operate using IS-835-D and future versions, but may not be possible for earlier versions of PDSNs 412 such as PDSNs 412 that operate using IS-835-C and earlier versions.

The PCF sends an A9-Connect-A8 message 418 to the BSC 406 as an acknowledgement to the A9-Setup-A8 message 408. If the PDSN's 412 Version/Capability indication is received in the A11-Registration-Reply message 416, then the PCF 410 forwards the capability indication to the BSC 406 in the A9-Connect-A8 message 418. If the PDSN's 412 Version/Capability indication is not received in the A11-Registration-Reply message 416, but the PCF 410 knows the PDSN's Version/Capability (for example, if configured by a network operator), then the PCF 410 may include the capability indication in the A9-Connect-A8 message 418 to the BSC 406. The BSC 406 sends a Service Connect message 420 to the MS 402. The BSC 406 may include the PDSN's 412 Version/Capability indication in the Service Connect Message 420 to the MS 402. Alternatively, the BSC 406 may forward the capability indication in a dedicated signaling message to the MS 402 after sending the Service Connect Message 420, for example in a Network Version/Capability Message.

An advantage of using the OTA signaling is that if the MS can indicate its Version/Capability, and the PCF can indicate the selected PDSN's Version/Capability, the MS will know the PDSN's Version/Capabilities that are supported. As a result, the MS can avoid unnecessary signaling exchange with the PDSN if the PDSN does not support a particular Version/Capabilities. For example, if the MS knows that the serving PDSN is operating using an earlier version of IS-835, such as version C or earlier, then the MS can avoid sending signaling for features that are only supported by later versions of the specification, such as version D features like Dynamic Host Configuration Protocol (DHCP). Likewise, if the MS knows that the Home Agent (HA), the element that identifies the IPv4 address of the PDSN that terminates the A10 connection, supports revocation, then the MS can avoid sending a Registration Request (RRQ) with lifetime zero to de-register during power-down. The MS may not know the HA's revocation capability directly but the MS may know it indirectly, for example from the PDSN.

The PDSN can also take advantage of knowledge of the Version/Capabilities of the MS. For example, if the PDSN knows that the MS doesn't support ROHC before Internet Protocol Control Protocol (IPCP) starts, then the PDSN can exclude ROHC capability indication in the initial IPCP Configure-Request sent to the MS, even if the PDSN supports ROHC. This would avoid extra signaling of IPCP control messages during IPCP negotiation.

Other benefits of the OTA technique include notifying a user or facilitating network operation. For example, if a MS knows that the PDSN supports a PrePaid feature, then the MS may notify the user about this feature. This would allow the user to replenish an existing account or open a new PrePaid account.

Another example where knowledge of the MS Version/Capability can facilitate network operation can be illustrated if there are two MSs communicating with the same PDSN and the first MS supports only Mobile IPv4 and the second MS supports both Simple IPv4 and Mobile IPv4. If both MSs send RRQs to request for Mobile IP service, but the Foreign Agent (FA) in PDSN is nearing its capacity it may not be able to support both MSs request for Mobile IPv4. Knowing the capabilities of the MSs, the PDSN may grant Mobile IP service to the first MS but not to second MS thereby effectively forcing the second MS to fallback to Simple IPv4. In this way, both MS's requests are supported, albeit the second MS is operating at less than its full capability, rather than just supporting one of the two MS's request.

The PDSN and MS can also indicate earlier versions of IS-835 plus selected features, both mandatory and optional, from later versions of IS-835. This allows the flexibility for a carrier to deploy desired features from a later version on top of an earlier version of IS-835. For example, if a carrier wants to deploy PDSNs that are operating Version A of IS-835, and that additionally support dynamic home agent (DHA) and Version/Capability indication; then the PDSN can indicate to the MS that it supports IS-835 version A features plus DHA.

Example Version/Capability Packet Format

Figure 5:
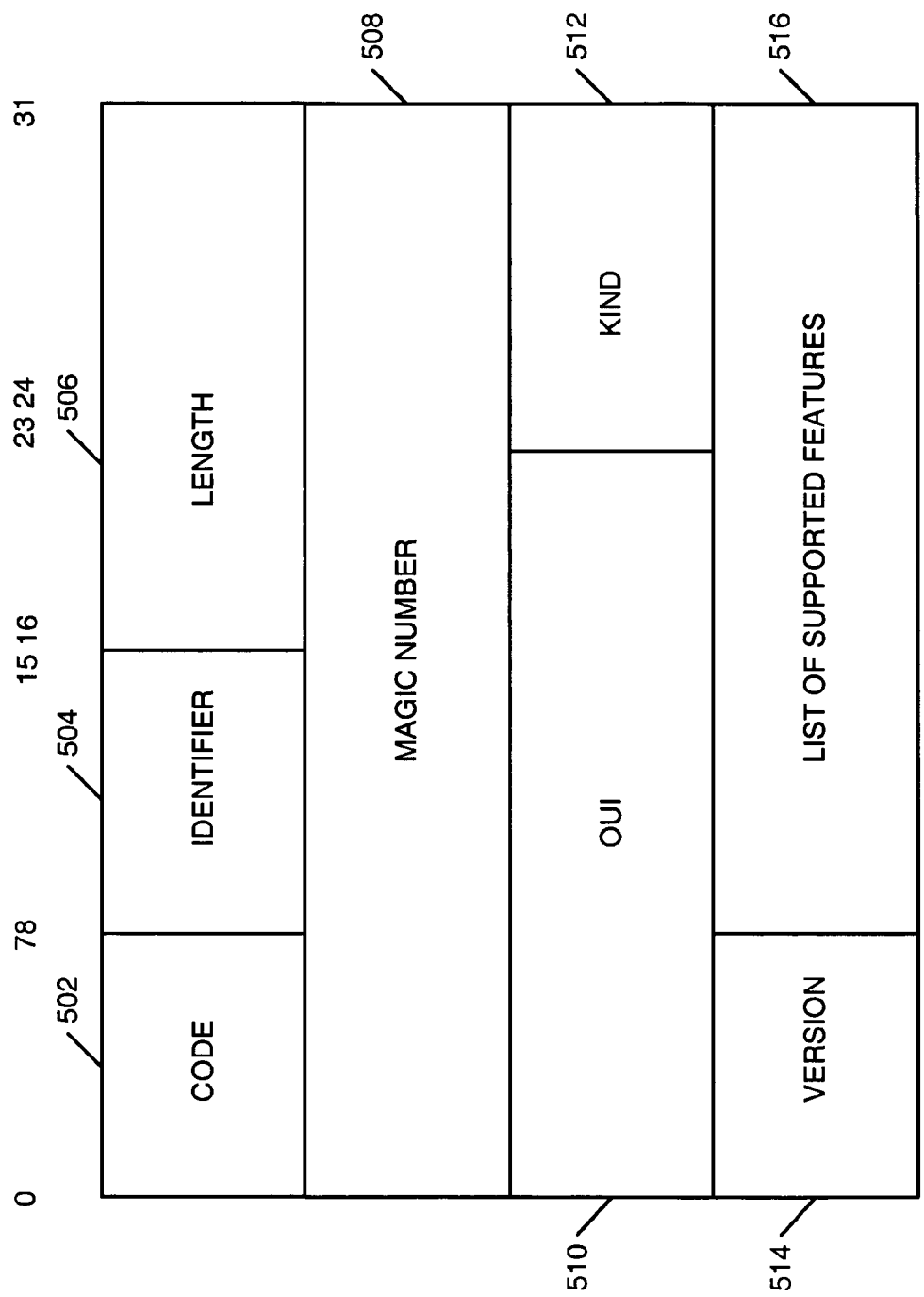
FIG. 5 is a diagram illustrating an exemplary Version/Capability packet format.

The Version/Capability information can be conveyed in different types of data packets. For example, the Version/Capability information can be conveyed in a PPP vendor-specific packet called the Version/Capability packet. The general format of a PPP vendor-specific packet is defined in RFC 2153 to the 3GPP2, incorporated in its entirety herein. FIG. 5 is a diagram illustrating an exemplary Version/Capability packet format. As shown in FIG. 5 the packet 500 includes a code field 502, an identifier field 504, a length field 506, a "magic number" field 508, a 3GPP2 Organizationally Unique Identifier (OUI) field 510, a kind field 512, a version field 514, and a list of supported features field 516. The contents of the code field 502, identifier field 504, length field 506, and "magic number" field 508 are defined in RFC 2135, that includes detailed descriptions of these fields. The OUI field 510 identifies the organization that specifies the fields and formats in this PPP vendor-specific packet. The organization in this case is the 3GPP2.

The kind field 512 identifies the type of the packet. For example, a kind code of "2" could be used to identify the Version/Capability Indication packet and a "3" could be used to identify the Version/Capability Reply packet. If the Kind value is "2", the Version/Capability Indication packet includes the Version field and List of Capabilities. If the Kind value is "3", the Version/Capability Reply packet does not include the Version field and List of Capabilities. The Version field and List of Capabilities are defined as follows.

The version field 514 is used to identify the version of IS-835 that the source is using. For example, a version field of 1, 2, 3, or 4 could be used to represent IS-835 versions A, B, C, and D respectively. In this example, the version field is 8 bits and can thus be used to represent up to 256 different versions. The value of the version field 514 indicates that the sender, either the MS or PDSN, supports all mandatory requirements pertaining to the identified version of the Wireless IP Network Standard IS-835. For example, if the PDSN indicates "4" as the Version value, it means that the PDSN supports all mandatory MS requirements specified in Version D.

The list of supported features field 516 indicates what optional features that are supported by the sender of the packet 500. For example, the list of supported features field 516 can include flags, with each flag representing either an optional feature to the mandatory features of the version identified in the version field 514. In addition, the list of supported features field 516 can include flags representing an additional feature, either optional or mandatory, supported by a later version that the version identified in the version field 514. For example, if a PDSN is compliant with all the mandatory PDSN requirements in IS-835 Version A and supports Dynamic Home Agent (DHA), then the PDSN indicates "1" in the version field 514, indicating Version A, and enables a flag corresponds to the DHA feature within the list of supported features field 514. In this example the PDSN doesn't support all other additional mandatory features of IS-835 Version. B, such as IPv6; and thus cannot indicate a "2" in the Version field 514 corresponding to IS-835 Version B. This example assumes that the PDSN operating with IS-835 Version A plus PDSN also supports the PPP Version/Capability packet.

An aspect of this technique is to define flags only for features that are useful to the receiver, and not defining flags for other features. For example, a Version/Capability packet sent from a PDSN to a MS would not include a flag identifying the option the PDSN uses to attain an Internet Key Exchange (IKE) pre-shared key for establishing a security association with an HA because it makes no difference to the MS which option the PDSN uses. Thus, before defining the flags that will be included within the list of supported features field 516, a determination is made about which features are the relevant for the list.

EXAMPLE 1

List of Supported Capabilities for both MS and PDSN

In this example, the List of Supported Capabilities contain both MS and PDSN supported capabilities. Table 1, below, identifies capabilities that might be useful in reducing unnecessary signaling exchange or facilitating network operations. For each capability listed in the first (left) column, the table identifies whether the indication of this capability is useful to the receiver (middle column), and who needs to send the indication (the right-hand column). The table lists examples of capabilities and is not intended to be exhaustive. Also, capabilities based on IS-835 Version D are not listed in Table 1 and can be added to the list when a particular capability is adopted.

TABLE 1

| Optional Capability | Is it useful to indicate this capability to the receiver? | Who sends the indication? |
|---|---|---|
| Simple IPv4 | Help PDSN operation (see the example in section 1) | MS |
| Mobile IPv4 | Same as above | MS |
| Simple IPv6 | If not supported, can avoid sending unnecessary signaling. | PDSN |

TABLE 1-continued

| Optional Capability | Is it useful to indicate this capability to the receiver? | Who sends the indication? |
|---|---|---|
| Max PPP inactivity timer | If the MS is always-on but does not support the 3GPP2 vendor specific Max PPP Inactivity Timer value packet, the PDSN can avoid sending unnecessary vendor-specific packets to the MS. If a PDSN prior to Release C supports the Max PPP inactivity timer, the mobile knows to use the feature. | MS/PDSN |
| ROHC [RFC3095] | If the sender doesn't support it but the receiver supports it, the receiver may not indicate this capability in the initial IPCP Configure-Request sent to the sender. This may avoid extra round trip during IPCP negotiation. | MS/PDSN |
| LLA-ROHC U/O modes [RFC3242] | Same as above | MS/PDSN |
| IPHC [RFC2507] | Same as above | MS/PDSN |
| LLA-ROHC U/O/R modes [RFC3408] | Same as above | MS/PDSN |
| ECRTP [RFC3545] | Same as above | MS/PDSN |
| Multiple service instances | If PDSN doesn't support it, MS can avoid sending unnecessary signaling for flow mapping/treatment and OTA signaling for originating auxiliary service instances. | MS/PDSN |
| DNS server address auto-configuration | If PDSN doesn't support DNS server address auto-configuration, MS can avoid extra round trip of IPCP negotiation by not including the DNS Server Address option. This is a mandatory PDSN feature in Version B and later versions. | PDSN |
| Dynamic HA | If PDSN doesn't support DHA, MS can avoid unsuccessful Mobile IP registration by not indicating 0.0.0.0 or 255.255.255.255 in the HA field of the RRQ. This is a mandatory PDSN feature in Version B and later versions. | PDSN |
| Always-On | This is an optional PDSN feature in Version B but mandatory in Version C. This indicator may be useful to the MS in deciding which access method to be used for the always-on experience. For example, if the version-B PDSN doesn't support always-on, and the MS wants the always-on experience, the MS may use Mobile IP as the access method and then continue the session by refreshing the Mobile IP registration lifetime periodically. | PDSN |
| Revocation support in HA | If HA supports revocation, the MS can avoid sending RRQ with lifetime zero to de-register during power-down. Upon receiving RRP, the PDSN knows whether the HA supports revocation, so that the PDSN can indicate this feature to the MS. | PDSN |
| Dynamic Authorization Extensions (DAE) support | If DAE is used for resource management in PDSN and HA, the MS can avoid sending RRQ with lifetime zero to de-register during power-down. | PDSN |

Exemplary List of Capabilities Included in the List of Supported Capabilities Field The list of capabilities can be further divided into two categories. The first category is for those features that should be indicated as early as possible during establishment of the packet data session. All the features in the above table, except the last two, belong to the first category and should be indicated during the PPP Link Control Protocol (LCP) phase. The second category is for those features that may be indicated at a later time. The last two features in the above table belong to the second category, because during LCP the PDSN may not know whether Mobile IP revocation, or Dynamic Authorization Extension (DAE) would be used for the MS.

Figure 6:
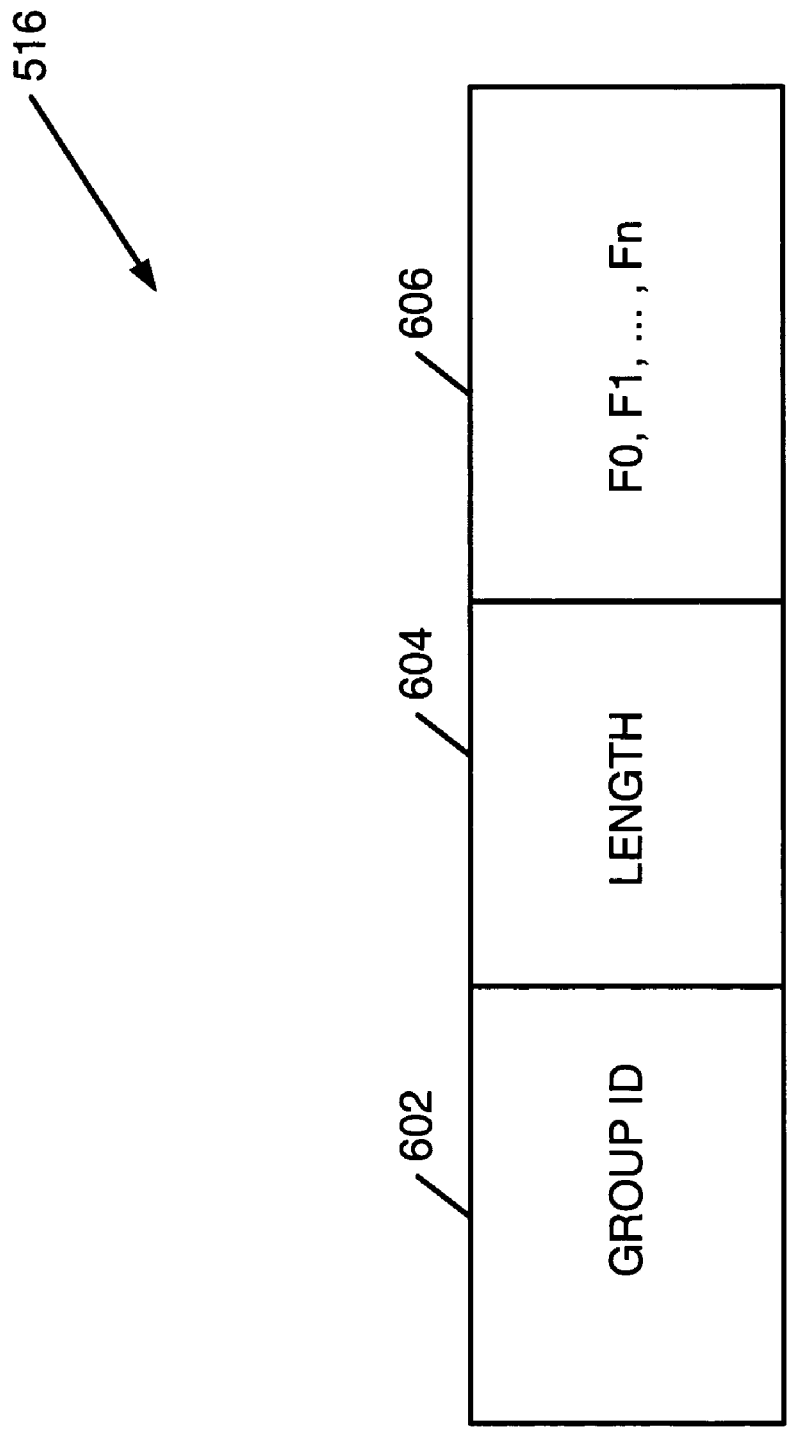
FIG. 6 is a diagram illustrating additional detail of an exemplary list of supported features field as shown in FIG. 5

FIG. 6 is a diagram illustrating additional detail of an exemplary list of supported features field as shown in FIG. 5. As shown in FIG. 6, the list of supported features field 516 includes a group ID field 602, a length field 604 and a flag field 606. The group ID field 602 that identifies which of the two categories, either those features that should be indicated as early as possible during the packet data session establishment or those features that may be indicated at a later time, the features in the list belong to. For example, the group ID field 602 can be one byte long, and be either one of two values, either "0" or "1" with other values reserved. In this example, if the group ID field 602 is a "0", then the list contains features belonged to the first category and if it's a "1", then list contains features belonged to the second category.

The length field 604 indicates the length of the list of supported features field 514. The length includes the group ID field 602, the length field 604, and flag field 606. For example, the length field 604 may be one byte whose value is in the number of bytes in the list of supported features field 514.

The flag field 606 indicates the relevant features supported by the sender, for example the MS or the PDSN. For example, if a feature is supported, the corresponding flag is set to one and if a feature is not supported, the flag is set to zero.

Table 2 below lists an example of possible flags that could be included within the flag field 606. In the example list of Table 2 the group ID field value is "0" representing Category 1 type of flags, the length field value is set to "4" representing four bytes: one for the group ID field; one for the length field; and two for the flag field. Table 2 lists possible flags for Category 1.

TABLE 2

Example Category 1 Flags

| | |
|---|---|
| F0 = Simple IPv4 | (set by MS) |
| F1 = Mobile IPv4 | (set by MS) |
| F2 = Max PPP inactivity timer support | (set by MS) |
| F3 = ROHC [RFC 3095] | (set by MS or PDSN) |
| F4 = LLA-ROHC [RFC 3242] | (set by MS or PDSN) |
| F5 = IPHC [RFC 2507] | (set by MS or PDSN) |
| F6 = LLA-ROHC U/O/R modes [3408] | (set by MS or PDSN) |
| F7 = ECRTP [3545] | (set by MS or PDSN) |
| F8 = Multiple service instances | (set by MS or PDSN) |
| F9 = DNS server address auto-configuration | (set by PDSN) |
| F10 = Dynamic HA assignment | (set by PDSN) |
| F11 = Always-on support | (set by PDSN) |
| F12 = Simple IPv6 | (set by PDSN) |
| F13 to F15 = reserved bits set to 0s | |

Table 3 below lists another example of possible flags that could be included within the flag field 606. In the example list of Table 3 the group ID field value is "1" representing Category 2 type of flags, the length field value is set to "3" representing three bytes: one for the group ID field; one for the length field; and one for the flag field. Table 3 lists possible flags for Category 2.

TABLE 3

Example Category 2 Flags

| | |
|---|---|
| F0 = Revocation support in HA | (set by PDSN) |
| F1 = DAE support | (set by PDSN) |
| F2 to F7 = reserved bits set to 0s | |

The MS and PDSN may send version/capability packets to each other at the beginning of the LCP phase, in order to minimizing unnecessary signaling exchange later. For example, if the MS, or PDSN, initiates a PPP negotiation, it can send an LCP Configure-Request immediately followed by the version/capability packet. In this example, the version/capability packet should include capabilities included in the first category, that is those capabilities that should be indicated as early as possible during the packet data session establishment.

The MS and PDSN may also exchange the version/capability packets anytime during the PPP session. For example, the PDSN may notify the MS about its HA's revocation capability after the session has already been established because the MS will not take advantage of this feature until ending the session. In other words, during the LCP phase, the PDSN may not know whether the MS's HA supports revocation. During Mobile IP registration, if the PDSN receives a Mobile IP RRQ containing the Revocation Support Extension, the PDSN may send a version/capability packet indicating the support of HA revocation capability. The version/capability packet in this example may include only the second category type of features, those that need not be identified during session establishment, and the first category type of features may not be included.

Upon receiving a version/capability packet, the MS, or PDSN, can reply with a version/capability Echo-Reply that contains the Version value and the List of Supported Features in the received version/capability packet. In this way it is acknowledged that the version/feature packet was properly received.

EXAMPLE 2

Separate List of Supported Capabilities for MS and PDSN

In another example separate lists of capabilities for the MS and PDSN can be supported. In this example, two List of Supported Capabilities are defined, one for the MS and one for the PDSN. Also in this example, it is assumed that only version-D MS and PDSN have the ability to indicate version/capabilities. In other words, MS and PDSN prior to version D do not have this ability.

The List of MS Capabilities is coded as a bit mask defined in Table 4 below. C0 is the most-significant bit in the list. Each bit in the list indicates whether an MS capability specified in X.S0011-D is supported.

TABLE 4

List of MS Capabilities

| Bit | MS Capability | Description |
|---|---|---|
| C0 | Simple IPv4 | Set to 1 if MS supports Simple IPv4. |
| C1 | Mobile IPv4 | Set to 1 if MS supports Mobile IPv4. |
| C2 | Simple IPv6 | Set to 1 if MS supports Simple IPv6. |
| C3 | Mobile IPv6 | Set to 1 if MS supports Mobile IPv6. |
| C4 | Max PPP inactivity timer | Set to 1 if MS supports the 3GPP2 vendor specific Max PPP Inactivity Timer packet. |
| C5 to C23 | Reserved | |

The List of PDSN Capabilities is coded as a bit mask defined in Table 5 below. C0 is the most-significant bit in the list. Each bit in the list indicates whether a PDSN capability specified in X.S0011-D is supported.

TABLE 5

List of PDSN Capabilities

| Bit | PDSN Capability | Description |
|---|---|---|
| C0 | Auxiliary SI for SO 60 | Set to 1 if PDSN supports the auxiliary service instance for SO 60. |
| C1 | Auxiliary SI for SO 61 | Set to 1 if PDSN supports the auxiliary service instance for SO 61. |
| C2 | Auxiliary SI for SO 66 | Set to 1 if PDSN supports the auxiliary service instance for SO 66. |
| C3 | HA Resource Management | Set to 1 if PDSN discovers that the HA resource management is supported via Mobile IP revocation. |
| C4 to C23 | Reserved | |

During the LCP negotiation, the MS shall send the Version/Capability Indication packet. The MS should resend the Version/Capability Indication packet a configurable number of times if no Version/Capability Indication packet from the PDSN is received. If the MS receives the Configure-Reject, the MS shall stop resending the Version/Capability Indication packet. The reception of Configure-Reject means that the PDSN is version C or earlier.

If the MS receives the Version/Capability Indication packet from the PDSN, the MS shall respond with the Version/Capability Reply packet, and the MS shall not send any more Version/Capability Indication packets during the PPP session.

If the PDSN receives the Version/Capability Indication packet from the MS, the PDSN shall respond with the Version/Capability Indication packet. The PDSN should resend the Version/Capability Indication packet a configurable number of times if no Version/Capability Reply packet from the MS is received. After receiving the Version/Capability Reply packet from the MS, if the PDSN receives the Version/Capability Indication packet, the PDSN shall ignore it.

The PDSN shall not send the Version/Capability Indication packet if it did not receive the Version/Capability Indication packet from the MS. If the PDSN did not receive the Version/Capability Indication packet from the MS, most likely it is an earlier version MS that does not support the version/capability indication. Therefore, it is wasteful for the PDSN to send the Version/Capability Indication packet to the MS.

If the PDSN previously received the Version/Capability Indication packet from the MS, the PDSN may send the Version/Capability Indication packet to the MS anytime after the PPP session is established. This allows the PDSN to indicate network capabilities that are not available to the PDSN during the PPP session establishment. For example, the PDSN initially may not know whether HA resource management is supported until during the Mobile IP registration.

Exemplary MS

Figure 7:
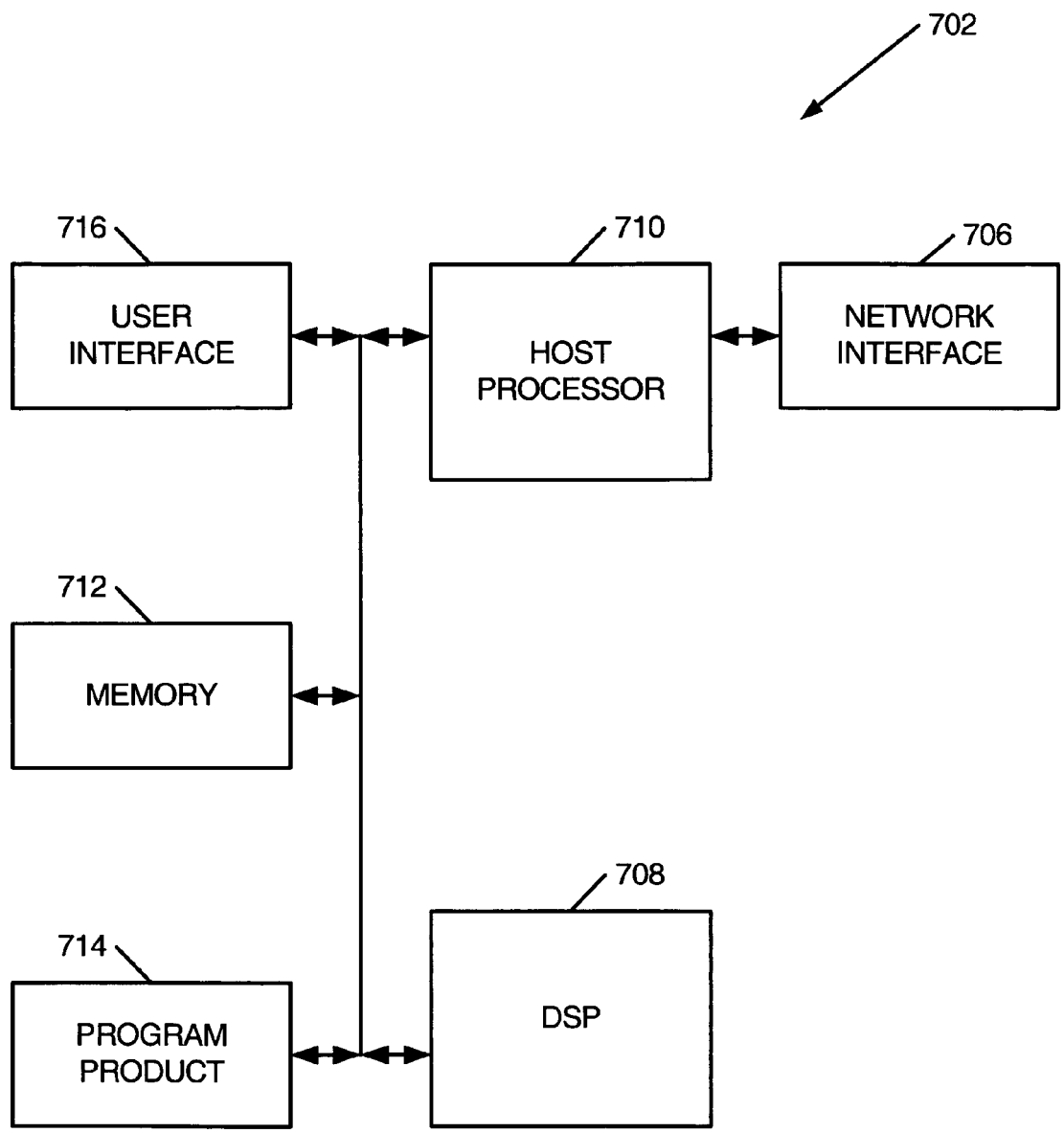
FIG. 7 is a block diagram of a wireless communication device, or MS, constructed in accordance with an exemplary embodiment of the present invention.

FIG. 7 is a block diagram of a wireless communication device, or MS, constructed in accordance with an exemplary embodiment of the present invention. The communication device 702 includes a network interface 706, digital signal processor (DSP) 708, a host processor 710, a memory device 712, a program product 714, and a user interface 716.

Signals from the infrastructure are received by the network interface 706 and sent to the host processor 710. The host processor 710 receives the signals and, depending on the content of the signal, responds with appropriate actions. For example, the host processor 710 may determine the contents of a data packet received itself, or it may route the received data packet to the DSP 708 where the contents of the packet are determined. The host processor 710 may also receive data packets from the DSP 708 and route these packets to the network interface 706 for transmission to the infrastructure. Alternatively, the host processor 710 may intercept the DSP 708 output and modify the data packets, and then route the modified data packets to the network interface 706 for transmission to the infrastructure.

In one embodiment, the network interface 706 may be a transceiver and an antenna to interface to the infrastructure over a wireless channel. In another embodiment, the network interface 706 may be a network interface card used to interface to the infrastructure over landlines.

Both the host processor 710 and the DSP 708 are connected to a memory device 712. The memory device 712 may be used to store data during operation of the WCD, as well as store program code that will be executed by the host processor 710 or the DSP 708. For example, the host processor, DSP, or both, may operate under the control of programming instructions that are temporarily stored in the memory device 712. The host processor and DSP also can include program storage memory of their own. When the programming instructions are executed, the host processor 710 or DSP 708, or both, perform their functions, using features that have been identified in a Version/Capability data packet. Thus, the programming steps implement the functionality of the respective host processor or CPU, and DSP, so that the host processor and DSP can each be made to perform the functions in accordance with the supported features as desired. The programming steps may be received from a program product 714. The program product 714 may store and transfer the programming steps into the memory 712 for execution by the host processor, CPU, or both.

The program product 714 may be semiconductor memory chips, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 714 may be the source file including the program steps that is received from the network and stored into memory and is then executed. In this way, the processing steps necessary for operation in accordance with the invention may be embodied on the program product 714. In FIG. 7, the exemplary storage medium is shown coupled to the host processor such that the host processor may read information from, and write information to, the storage medium. Alternatively, the storage medium may be integral to the host processor.

The user interface 716 is connected to both the host processor 710 and the DSP 708. For example, the user interface may include a keypad, or special function keys or buttons, that are routed to the host processor 710 and may be used by a user to request specific operation by the initiating device. The user interface 716 may also include a speaker that is connected to the DSP 710 and used to output audio data to the user.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, DVD storage, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing packet data services for a mobile station, the method comprising:
   establishing an over-the-air physical layer connection to a wireless network infrastructure;
   receiving a first message comprising a first field indicating a wireless packet data standard version supported in the wireless network infrastructure, the wireless packet data standard version supported in the wireless network infrastructure having one or more mandatory features, and a second field indicating each of one or more additional capability features in addition to the one or more mandatory features of the wireless packet data standard version supported in the wireless network infrastructure, via the over-the-air physical layer connection;
   transmitting packet data using a network layer corresponding to the wireless packet data standard version supported in the network infrastructure, the packet data being produced in the mobile station in accordance with the wireless packet data standard version supported in the wireless network infrastructure and the additional capabilities supported in the wireless network infrastructure; and
   transmitting a second message comprising a third field indicating a wireless packet data standard version supported in the mobile station, the wireless packet data standard version supported in the mobile station having one or more mandatory features, and a fourth field indicating each of one or more additional capability features in addition to the one or more mandatory features of the wireless packet data standard version supported in the mobile station.

2. The method of claim 1, wherein the wireless packet data standard version supported in the mobile station is a version of IS-835.

3. The method of claim 1, wherein the wireless packet data standard version supported in the wireless network infrastructure is a version of IS-835.

4. The method of claim 1, wherein the over-the-air communication connection is a radio channel.

5. The method of claim 4, wherein the radio channel is a CDMA channel.

6. The method of claim 1, wherein the network infrastructure further comprises a packet data service node.

7. The method of claim 6, wherein the wireless packet data standard version supported in the network infrastructure is the version supported in the packet data service node.

8. The method of claim 1, wherein the mobile station comprises a wireless telephone.

9. The method of claim 1, wherein the mobile station comprises a wireless communication enabled personal computer.

10. The method of claim 1, wherein the mobile station comprises a personal digital assistant device.

11. The method of claim 1, wherein the first message is received during origination of a data session with the network infrastructure.

12. The method of claim 1, wherein the first message is received after origination of a data session with the network infrastructure.

13. The method of claim 1, further comprising adjusting a transmission protocol based on the wireless packet data standard version supported in the wireless network infrastructure, the one or more additional capability features supported in the wireless network infrastructure, the wireless packet data standard version supported in the mobile station, and the additional capability features supported in the mobile station.

14. A mobile station, comprising:
   a receiver configured to receive, via an over-the-air physical layer connection to a wireless network infrastructure, a first message comprising a first field indicating a wireless packet data standard version supported in the wireless network infrastructure, the wireless data standard version supported in the wireless network infrastructure having one or more mandatory features, and a second field indicating each of one or more additional capability features in addition to the one or more mandatory features of the wireless packet data standard version supported in the wireless network infrastructure; and
   a processor configured to adjust the mobile station's operation in accordance with the wireless packet data standard version supported in the wireless network infrastructure and the one or more additional capability features supported in the wireless network infrastructure and to transmit a second message comprising a third field indicating a wireless packet data standard version supported in the mobile station, the wireless packet data standard version supported in the mobile station having one or more mandatory features, and a fourth field indicating each of one or more additional capability features in addition to the one or more mandatory features of the wireless packet data standard version supported in the mobile station.

15. The mobile station of claim 14, wherein the wireless packet data standard version supported in the mobile station is a version of IS-835.

16. The mobile station of claim 14, wherein the wireless packet data standard version supported in the wireless network infrastructure is a version of IS-835.

17. A wireless network infrastructure, comprising:
   a receiver configured to receive, via an over-the-air physical layer connection to a wireless network infrastructure, a first message comprising a first field indicating wireless packet data standard version supported in a mobile station, the wireless packet data standard version supported in the mobile station having one or more mandatory features, and a second field indicating each of one or more additional capability features in addition to the one or more mandatory features of the wireless packet data standard version supported in the mobile station; and a processor configured to adjust the wireless network infrastructure operation in accordance with the wireless packet data standard version supported in the mobile station and the additional capability features supported in the mobile station and to transmit a second message comprising a third field indicating a wireless packet data standard version supported in the wireless network infrastructure, the wireless packet data standard version supported in the wireless network infrastructure having one or more mandatory features, and a fourth field indicating each of one or more additional capability features in addition to the one or more mandatory features of the wireless packet data standard version supported in the wireless network infrastructure.

18. The wireless network infrastructure of claim 17, wherein the wireless packet data standard version supported in the mobile station is a version of IS-835.

19. The wireless network infrastructure of claim 17, wherein the wireless packet data standard version supported in the wireless network infrastructure is a version of IS-835.

20. The wireless network infrastructure of claim 17 further comprising a base station.

21. The wireless network infrastructure of claim 17 further comprising a packet data service node.

22. A non-transient computer-readable medium having processor-executable instructions stored thereon, the processor-executable instructions for providing packet data services for a mobile station, comprising:

code for causing a processor to establish an over-the-air physical layer connection with a wireless network infrastructure;

code for causing the processor to receive a first message comprising a first field indicating a wireless packet data standard version supported in the wireless network infrastructure, the wireless packet data standard version supported in the wireless network infrastructure having one or more mandatory features, and a second field indicating each of one or more additional capability features in addition to the one or more mandatory features of the wireless packet data standard version supported in the wireless network infrastructure, via the over-the-air physical layer connection;

code for causing the processor to transmit packet data using a network layer corresponding to the wireless packet data standard version supported in the wireless network infrastructure, the packet data being produced in the mobile station in accordance with the wireless packet data standard version supported in the wireless network infrastructure and the one or more additional capability features supported in the wireless network infrastructure; and code for causing the processor to transmit a second message comprising a third field indicating a wireless packet data standard version supported in the mobile station, the wireless packet data standard version supported in the mobile station having one or more mandatory features, and a fourth field indicating each of one or more additional capability features in addition to the one or more mandatory features of the wireless packet data standard version supported in the mobile station.

23. The computer-readable medium as defined in claim 22, wherein the wireless packet data standard version supported in the mobile station is a version of IS-835.

24. The computer-readable medium as defined in claim 22, wherein the wireless packet data standard version supported in the wireless network infrastructure is a version of IS-835.

25. The computer-readable medium as defined in claim 22, further comprising adjusting a transmission protocol based on the wireless packet data standard version supported in the wireless network infrastructure, the one or more additional capability features supported in the wireless network infrastructure, the wireless packet data standard version supported in the mobile station, and the one or more additional capability features supported in the mobile station.

26. An apparatus, comprising:

means for establishing an over-the-air physical layer connection to a wireless network infrastructure;

means for receiving a first message comprising a first field indicating a wireless packet data standard version supported in the wireless network infrastructure, the wireless packet data standard version supported in the wireless network infrastructure having one or more mandatory features, and a second field indicating each of one or more additional capability features in addition to the one or more mandatory features of the wireless packet data standard version supported in the wireless network infrastructure, via the over-the-air physical layer connection;

means for transmitting packet data using a network layer of the wireless packet data standard version supported in the wireless network infrastructure, the packet data being produced in a mobile station in accordance with the wireless packet data standard version supported in the wireless network infrastructure and the one or more additional capability features supported in the wireless network infrastructure; and means for transmitting a second message comprising a third field indicating a wireless packet data standard version supported in the mobile station, the wireless packet data standard version supported in the mobile station having one or more mandatory features, and a fourth field indicating each of one or more additional capability features in addition to the one or more mandatory features of the wireless packet data standard version supported in the mobile station.

27. The apparatus of claim 26, further comprising:

means for adjusting a transmission protocol based on the wireless packet data standard version supported in the network infrastructure, the one or more additional capability features supported in the wireless network infrastructure, the wireless packet data standard version supported in the mobile station, and the one or more additional capability features supported in the mobile station.

* * * * *